United States Patent [19]

Takanashi et al.

[11] Patent Number: 5,120,624
[45] Date of Patent: Jun. 9, 1992

[54] OUTPUT DEVICE FOR PROOF AND PLANOGRAPH USING ELECTROPHOTOGRAPHIC RECORDING MEDIUM AND PRINTING MEDIUM THEREBY

[75] Inventors: Itsuo Takanashi, Kamakura; Takashi Yamamura, Yokohama; Toshikatsu Ichitou, Kawasaki; Hiromichi Tai, Yokosuka, all of Japan

[73] Assignee: Victor Company of Japan, Ltd., Yokohama, Japan

[21] Appl. No.: 531,406

[22] Filed: Jun. 4, 1990

[30] Foreign Application Priority Data

Jun. 6, 1989 [JP] Japan ............... 1-143228
Jun. 8, 1989 [JP] Japan ............... 1-146178

[51] Int. Cl.$^5$ ............... G03G 13/01; G03G 13/16
[52] U.S. Cl. ............... 430/47; 430/49; 346/160; 346/157
[58] Field of Search ............... 430/45, 49, 47; 358/76, 358/80, 300; 346/160, 157

[56] References Cited

U.S. PATENT DOCUMENTS

| | | | |
|---|---|---|---|
| 4,268,158 | 5/1981 | Naganuma et al. | 355/3 R |
| 4,593,326 | 6/1986 | Chevalier | 358/299 |
| 4,736,244 | 4/1988 | Shiota et al. | 358/76 |
| 4,985,322 | 1/1991 | Azami et al. | 430/44 |
| 5,019,472 | 5/1991 | Benack et al. | 430/45 |

FOREIGN PATENT DOCUMENTS

| | | |
|---|---|---|
| 58-142350 | 8/1983 | Japan . |
| 61-59970 | 8/1986 | Japan . |
| 63-141062 | 10/1988 | Japan . |
| 1-126074 | 8/1989 | Japan . |

*Primary Examiner*—John Goodrow
*Attorney, Agent, or Firm*—Fleit, Jacobson, Cohn, Price, Holman & Stern

[57] ABSTRACT

An output apparatus for printing a proof sheet and making a planographic printing plate, comprising a printing image data generating means for producing the digital data of a plurality of different color images corresponding to a predetermined number of colors obtained by the color separation of the image data of an original to be printed; a proof sheet outputting means for sequentially forming a screened dot image of each color by using each color toner based on the printing image data derived from said printing image generating means; a planographic printing plate output means for forming a screened dot image of each color by using one recording medium for each color and the oil affinitive toner of each color based on the digital data of each color generated by said printing image data generating means. By providing further a means for compensating for the difference in characteristics between the printing of a proof sheet and the planographic printing (actual printing), one output apparatus can output both the data for printing a proof sheet and the data of the actual printing (the planographic printing).

6 Claims, 12 Drawing Sheets

(1) SHEET WAITING MODE (2) SHEET TRANSPORTATION (3) PLACEMEMT OF SHEET OVER EXPOSURE STAND (4) MOVEMENT OF EXPOSURE STAND (5) ROTATION OF EXPOSURE STAND (6) MOVEMEMT OF EXPOSURE STAND (CHARGING)

(7) MOVEMENT OF EXPOSURE STAND (8) ROTATION OF EXPOSURE STAND (9) MOVEMENT OF EXPOSURE STAND (DEVELOPMENT)

(10) ROTATION OF EXPOSURE STAND
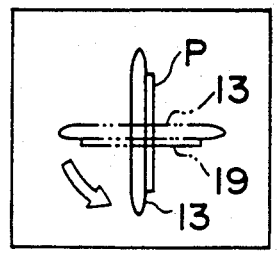
(11) MOVEMENT OF EXPOSURE STAND (DRYING FRONT SURFACE)
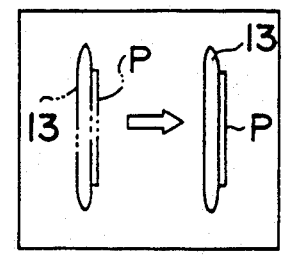
(12) MOVEMENT OF EXPOSURE STAND (DRYING REAR SURFACE)
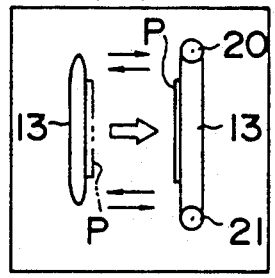
(13) SHEET DISCHARGE
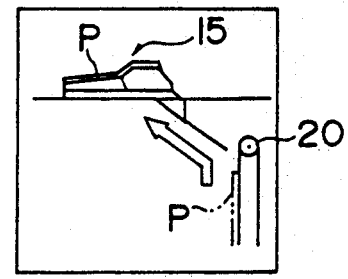
F I G. 5

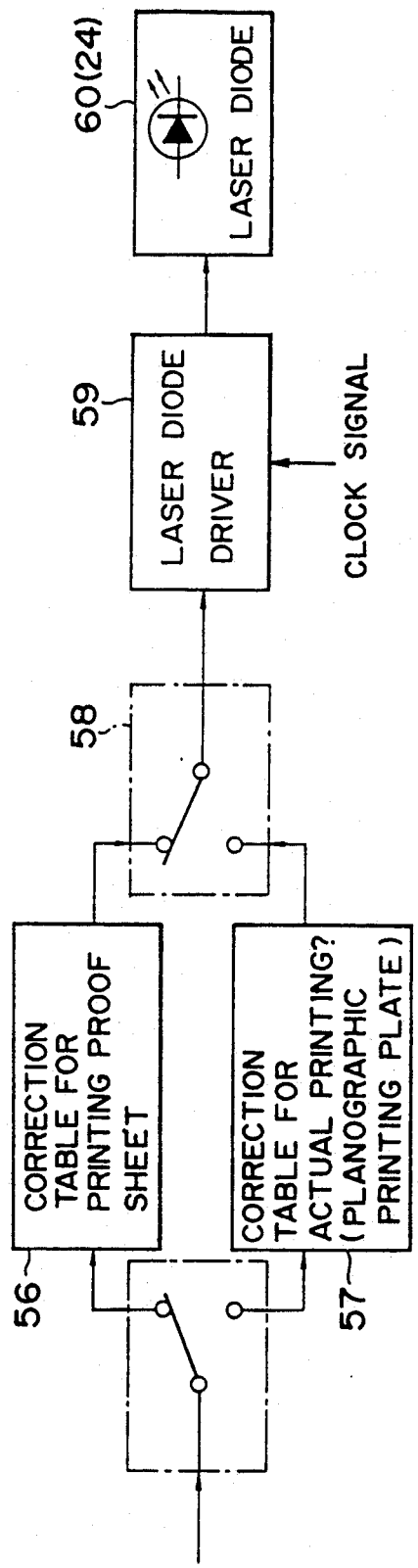
F I G. 16
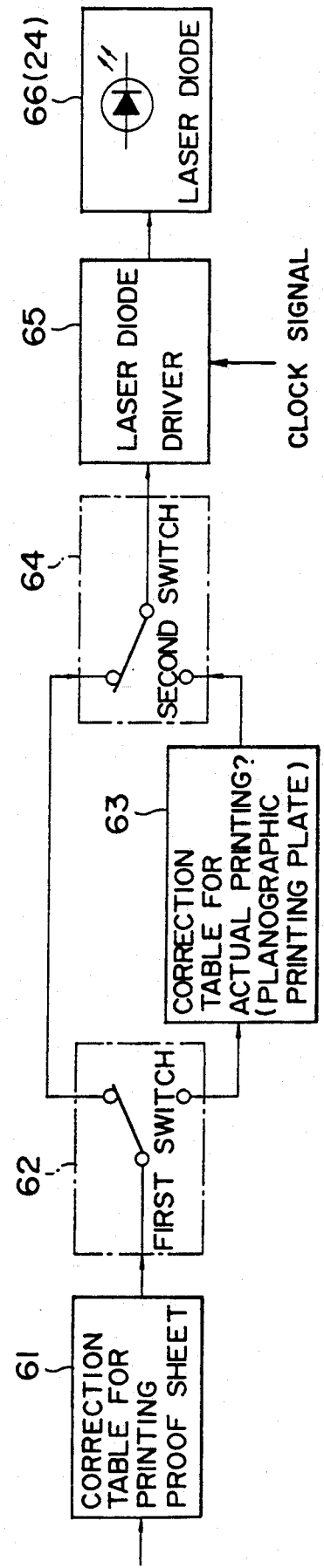
F I G. 17

OUTPUT DEVICE FOR PROOF AND PLANOGRAPH USING ELECTROPHOTOGRAPHIC RECORDING MEDIUM AND PRINTING MEDIUM THEREBY

BACKGROUND OF THE INVENTION

The present invention relates to an output device for simultaneously outputting a proof sheet and a planograph plate in a total printing system by using an electrophotographic recording medium, and to a printing method by using the output device. Prior to the description of the present invention, the term of "a planographic" is defined as a printing plate which is one of various printing plates without ruggedness and in the printing process. The planographic separates picture line portions (printed portions) and non picture line portions (non-printed portions) by a chemical or electrical function. Furthermore, the planographic divides the boundary between portions of one color and portions of another color in a color printing.

In the printing method using the electrophotographic plate, a pattern is formed over the surface of a photosensitive medium including a photoconductive medium and toner which consists of extremely fine and charged particles attached to a charge latent image, thereby forming a visible image.

Various methods for forming the electrophotographic image have been devised and demonstrated. In the CPC process, a toner image is formed on the surface of a recording medium in which a photosensitive medium consisting of as a photoconductive medium coated over a base. Another example is the PPC process in which transferred to a plain paper is a toner image formed over a recording and transfer medium having a photosensitive medium containing a photoconductive medium.

In the case of the CPC process of the type described above, the recording medium itself is photosensitive and a toner image is directly formed over the recording medium by the electrophotographic process, it is possible to easily form an image with a high degree of resolution, but this process has a problem that the color reproduction of a color image is adversely affected by the color of the surface of the recording medium.

On the other hand, according to the PPC process, freely used as a transfer paper is a white paper on which the color reproduction of a color image can be satisfactorily obtained.

However in the case of the PPC process (plain paper copier), even when a toner image formed over the cylindrical surface of a photosensitive drum to be transferred to the surface of a plain paper has a high degree of resolution, in the case of transfer, the image transferred to the plain paper has a relatively degraded degree of resolution. Because of this reason, a satisfactory color image having a high degree of resolution cannot be obtained.

But in the case of the total printing system, prints are obtained through the steps of obtaining an image, edition, preparing a block copy, making of a printing plate and printing. FIG. 18 is a flow chart schematically illustrating the planographic printing process obtaining a color image by the conventional printing system. In this case, the original of a color image to be printed is supplied as a color film. In the case of the printing system shown in FIG. 18, when the original color film is read out by a printing plate camera (for instance, an image scanner or a drum scanner) so as to obtain a colored image or print, in general, the original color is subjected to the color separation so as to be a plurality of colors; that is, the three primary colors for the subtractive mixture—yellow (Y), magenta (M) and cyan (C) in addition to black (BL). When the color separation films, in which each color is deposited at each screened dot, are made, they are then subjected to the proofing step so that a printing plate is made and proofed or the printing of a proof sheet is made based upon these color separated films.

When the printed proof sheet is unacceptable in quality, the color separated films are manually corrected, retouched, edited, patched and so on. Thereafter, they are returned to the original reading step. And these steps are repeated until a satisfactory proof sheet is obtained.

When the satisfactory proof sheet is thus obtained, a planographic printing plate is formed based on the color separated films for the actual printing and the actual printing is started.

In the printing system as shown in FIG. 18, the original color film is subjected to the color separation by the printing plate camera (such as an image scanner or a drum scanner) so as to obtain a plurality of colors required for the color printing (in general, three subtractive mixture primary colors, yellow (Y), magenta (M) and cyan (C) and black (BL), the total being four colors). When the image readout step outputs a digital image data corresponding to each screened dot of each color, the digital image is stored in the storage (MT, hard disk or the like) in the work station.

In the work station, based on the digital image data stored in the storage, the image processing such as layout, color matching, edition and so on is carried out and the result is confirmed on a display device or the output image from the color proof. When the result is acceptable, by a photographic film output apparatus or a recorder of the drum scanner, the color separated films for a block copy is made and sent to the edition step. Based on the color separated films thus obtained, a proof is printed. When the printed proof is unacceptable, the instruction is delivered to the work station so that the above described steps are repeated.

When the proof sheet is OK, based on the color separated films, the planographic printing plate is made and used in the case of the actual printing.

However, the conventional printing system described above with reference to FIG. 18 is fundamentally based on the existence of the color separated films in such a way, the separated color films used in proofing and in making a printing plate and so on, so that the system has the following problems.

The first problem resides in the fact that the image on each of the color separated films takes a long time and a great effort as well and the storage and control of the color separated films also become the problem.

The second problem is that the skilled workers are required in the case of proofing based on the color separated films; that is, no one can easily accomplish such operation. Furthermore, the proofing machine and the printing plate making machine must be installed independently of each other and they are very expensive.

Furthermore, there is a difference in color reproduction and the gain by dots between a printed proof sheet in which the toner images different in color are superposed one upon another in accordance with the above described electrophotographic process on the one hand and a color print obtained by the planographic printing press by using color ink for printing on the other hand. As a result, there is the problem that it is difficult to obtain the proof sheet substantially similar in color to the color print obtained by the planographic printing process.

Moreover there is the problem that the tone reproducibility or tone is different between a proof sheet and a print obtained by the printing press. The reason is as follows. In the case of a proof sheet, one views directly the image of toner deposited over a white sensitive medium such as titanium oxide. On the other hand, in the case of a print obtained by the printing press, it is obtained by the planographic printing process utilizing the difference in the "oil affinity" and the hydrophilic property between the image portions and the non-image portions. The sensitive media and toner used in printing are quite different from those used in printing a proof sheet. As shown in the first quadrant in FIG. 19, in the case of the proof printing, the input-output density characteristic (the gradation reproducibility) may be represented by a linear curve, but in the case of the print, its similar characteristic is not linear.

As shown in the second quadrant in FIG. 19, the tone reproducibility in the case of the planographic printing process is not a correct straight line so that in the case of the output in the actual printing, the tone reproducibility becomes further different. As a result, even when the gradation reproducibility is corrected to as be represented by an ideal straight line in response to the proof sheet, as shown in the third quadrant in the case of the actual printing, the gradation reproducibility is much deviated from a straight line.

SUMMARY OF THE INVENTION

In view of the above, the primary object of the present invention is to provide a universal print output apparatus which can accomplish the printing of a proof sheet and the making of the planographic printing plate without using color separation films and which is inexpensive and simple in maintenance.

Another object of the present invention is to provide an output apparatus and a printing method which can substantially coincide the color conditions of a color print printed by the planographic printing press with those of a color original or the like.

Another object of the present invention is to provide an output apparatus and a printing method which carries out the color printing after correcting the difference in gradation reproducibility between a proof sheet printed by a photoconductive medium having special properties and the toner on the one hand and a print printed by the planographic printing press by using a photoconductive medium having the property different from those of the first mentioned recording medium and the toner on the other hand.

To the above and other ends, the output apparatus in accordance with the present invention comprises a printing image data generating means for generating the image data of each color by using the digital image data of each color corresponding to the image data of a predetermined number of colors obtained by the color separation of an image data to be printed; an electrophotographic recording medium which consists of a lamination consisting of at least an electrode and a photoconductive layer having a white surface over which are formed the toner images by the light beam modulated by said printing image data in accordance with the electrophotographic process; a means for outputting a planographic printing plate consisting of a screened dot image of each color formed by a corresponding oil affinitive toner based on the printing image data of each color selected from said printing image data.

By the output apparatus with the above described construction, the digital image data of each color required for printing in color an image data to be printed (or the monochrome digital image data).

By using the digital data corresponding to the color image data, the image data of each color for printing is produced.

By forming a screened dot image of each color by sequentially using the toner of each color over the white surface of an electrophotographic recording medium of the printing image data according to the electrophotographic process by using the light beam modulated by the printing image data, the screened dot image is outputted as a proof sheet.

According the electrophotographic process including step for accomplishing the exposure by the light beam modulated by the printing image data, formed over the surface of an electrophotographic recording medium consisting of the lamination consisting of at least an electrode and a photoconductive layer by using the oil affinitive toner is a screened dot image respectively and the screened dot image thus formed is outputted as a planographic printing plate.

The output apparatus in accordance with the present invention comprises a printing image data generating means for generating the image data of each color for printing by using the digital image data of each color selected from a predetermined number of colors obtained by the color separation of the image data to be printed; an electrophotographic recording medium which consists of the lamination consisting of at least an electrode and a photoconductive layer and has a white surface over which is formed a screened dot image of each color sequentially by using a corresponding color toner based on the printing image data, thereby outputting the screened dot image thus formed as a proof sheet; and a means for forming a screened dot image of each color by using a corresponding oil affinitive toner respectively over the surface of one electrophotographic recording medium based on the printing image data of each color selected from the image data for printing. Therefore, during the processes for printing a proof sheet and producing a planographic printing plate, no photographic film is used. In addition, the operations for obtaining a proof sheet and a planographic printing plate are carried out in response to the electrical signal processing. Furthermore, the same output apparatus can be used to obtain a proof sheet and a planographic printing plate. As a result, the present invention can provide the output apparatus which does not need a skilled operator and is inexpensive.

The proof sheet printing method in accordance with the present invention comprises a step of sequentially forming a toner image of each color by the electrographic process by using the light beam modulated by the image data of each color for printing produced based on the digital image data of each color corresponding to the image data of a predetermined number of colors obtained by the color separation of the image data to be printed; a first proof sheet printing step in which over the surface of an overcoat layer of an electrophotographic recording medium similar in construction to the first mentioned recording medium is formed a toner image, which in turn is applied with heat and pressure so that the toner images are embedded into the overcoat layer, thereby making the electrographic recording medium having the overcoat layer in which are embedded the toner images as a proof sheet; and in second proof sheet printing step in which the surface over which are formed the toner images of the overcoat layer of one electrographic recording medium substantially similar in construction to the first mentioned recording medium and the surface of a transfer sheet are made into intimate contact with each other while applying heat to them so as to transfer the overcoat layer over which are formed the toner images to the transfer sheet and the overcoat layer is separated from the white photoconductive layer, whereby the transfer sheet integral with the overcoat layer over which are formed the toner images becomes a proof sheet.

According to the above-described proof sheet printing method, formed sequentially by using colored toner over the surface of the overcoat layer removably laminated over the white photoconductive layer overlaid over an electrically conductive base of an electrophotographic recording medium are the toner images of a predetermined number of colors, respectively, by the light beams which are modulated, respectively, by the color image data for printing corresponding to the image data of respective colors obtained by the color separation of the image data to be printed.

The toner images formed over the surface of the overcoat layer are applied with heat and pressure so that the toner images are embedded into the overcoat layer, whereby the electrographic recording medium itself is used as a proof sheet.

Furthermore, the surface over which are formed the toner images of the overcoat layer of one electrophotographic recording medium on the one hand and the surface of the transfer sheet on the other hand are into intimate contact with each other while heat is applied to them so that the overcoat layer over which are formed the toner images is transferred to the transfer sheet and is separated from the white photoconductive layer of the electrophotographic recording medium, whereby the transfer sheet now integral with the overcoat layer over which are formed the toner images is used as a proof sheet.

According to the above-described printing method, when heat and pressure are applied to the toner images formed over the surface of the overcoat layer of the electrophotographic recording medium so as to embed the toner images into the overcoat layer so that the electrophotographic recording medium itself is directly used as a proof sheet, a color image which has a satisfactory degree of half tone and the excellent gradation reproducibility can be easily formed. As a result, the proofing can be accomplished easily. On the other hand, when the overcoat layer is separated from the white photoconductive layer of the electrophotographic recording medium so that the transfer sheet integral with the overcoat layer is used as a proof sheet, the toner images can be transferred by 100% over a sheet of paper same as the printing sheet and the dot gain is substantially similar to that obtained in the actual printing so that the satisfactory proofing can be ensured.

The difference in gradation between the print printed by the planographic printing sheet on the one hand and the proof sheet is caused by the difference in gradation reproducibility between them. Therefore according to one aspect of the present invention, in order to substantially eliminate the difference in gradation reproducibility, the gradation by using different gradation correction tables for the planographic printing plate output and the printing a proof sheet is employed. Alternatively in the case of printing a proof sheet, one gradation correction table is used while in the case of the output of a planographic printing plate, another gradation correction table is superposed over the first mentioned gradation correction table. Conversely, in the case of the output of a planographic printing plate, one gradation correction table is used while in the case of printing a proof sheet, this correction table may be superposed with another gradation correction table.

As described above, according to the present invention, the difference in gradation between a print printed by the planographic printing press and a proof sheet can be substantially eliminated by using the gradation correction tables so that it becomes possible to coincide gradation of a print printed by the planographic printing press with the gradation of a proof sheet.

BRIEF DESCRIPTION OF THE DRAWINGS

FIG. 16 shows a view illustrating the construction of a correction table of the output apparatus in the third embodiment;

FIG. 17 is a view illustrating how the correction table of an output apparatus of a fourth embodiment in accordance with the present invention is switched;

DETAILED DESCRIPTION OF THE PREFERRED EMBODIMENTS

Now the preferred embodiments of the electrophotographic printing output apparatus will be described in detail with reference to the accompanying drawings.

First Embodiment, FIGS. 1-6

Figure 1:
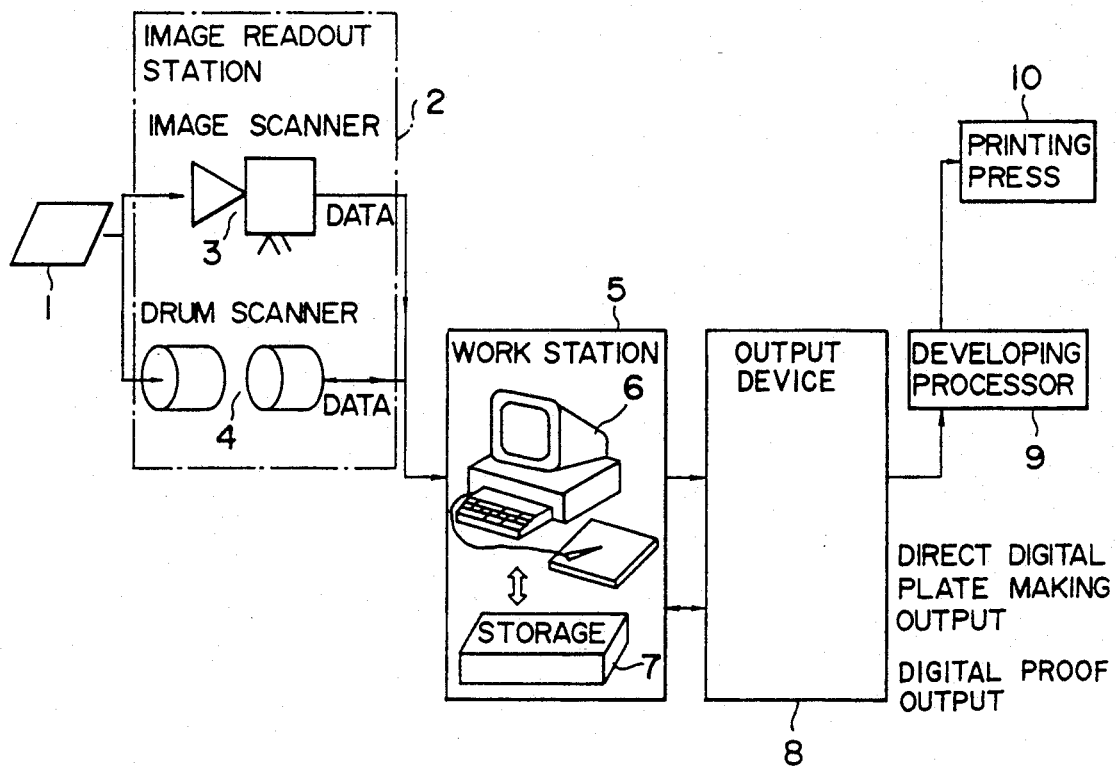
FIG. 1 is a block diagram illustrating a first embodiment of an electrophotographic printing system in accordance with the present invention including an output apparatus for printing a proof sheet and the planographic printing.

Referring first to FIG. 1 illustrating schematically a printing system including a proof sheet printing and planographic printing plate output apparatus, an original 1 is a film bearing a color image to be printed (for instance, a positive color film).

In an image readout station 2, the original 1 is subjected to the color separation process by an image scanner 3 or a drum scanner 4, which is a printing plate camera, so that the image of the original 1 is color-separated into a plurality of color images required for color printing. In the case of that a digital image data corresponding to each color image is outputted from the original readout station 2, the digital image data are stored in a storage 7 in a work station 5 and when the digital image data corresponding to each of digital image data each corresponding to a screened dot image of each color is read out from the image readout station 2, the digital image data is stored in the storage 7 in the work station.

In the work station, an image processor 6 carries out the image processing such as a layout, color matching, proofing and so on based on the digital image data stored in a storage 7 while viewing the color image displayed on a display device.

After the predetermined image processing has been accomplished in the work station 5, as in the case of the data delivered to the work station from the image readout station 2, it is preferable that the digital image data in DDES format corresponding to each color image from the standpoint of the exchange of data, even though the data delivered to a proof printing and a planographic printing plate output device 8 (hereinafter referred as "the output apparatus") may be the digital image data corresponding to each color image, the digital image data corresponding to the screened dot image of each color or another signal form data, and the delivered image data are converted into the digital image data corresponding of the screened dot images of respective colors.

When the image data to be printed is a monochrome original 1, the digital data delivered to the output device 8 after the predetermined image processing has been accomplished is, of course, the digital image data corresponding to the monochrome image.

The output apparatus 8 which receives the digital image data from the work station 5 converts the received digital image data into the printing image data for the digital image data corresponding to the screened dot images of respective colors (or the digital image data corresponding to the screened dot monochrome image) and uses the printing image data to output a proof sheet or a planographic plate.

When the output apparatus 8 carries out the operation for outputting a proof sheet, an electrographic recording medium comprising a lamination consisting of at least an electrode and a photoconductive layer and having a surface in white is used. Furthermore, according to the electrophotographic process including the step for exposure by light modulated by the printing image data, the output apparatus sequentially produces a screened dot image of each color by using toner for each color for the formation of a positive image, thereby outputting a proof sheet consisting of the screened dot images of respective colors. In the case of the production of a planographic plate by the output apparatus 8, it produces a planographic plate by forming the screened dot images in respective colors by applying individually different oil affinitive positive image formation toners to an electrophotographic recording medium consisting of the lamination of an electrodes and a photoconductive layer from printing image data of each color from the printing image data. When the output apparatus outputs a proofing sheet and a planographic printing plate, the electrophotographic recording medium consisting of the lamination at least consisting of an electrode and a photoconductive layer is used. Especially in the case of printing a proofing sheet, an electrophotographic recording medium whose surface is white and which contains titanium oxide is used so that toner having each color is used to form a color image over the white surface of each electrographic medium so that a satisfactory proofing sheet can be obtained.

When the proofing sheet thus obtained is acceptable, the output apparatus 8 makes a planographic printing plate used in the actual printing. In this case, it is not necessary that the surface of the electrophotographic recording medium used for making a planographic printing plate is white, but it is apparent that the electrographic recording medium used in case of making a planographic printing plate has a surface in white as in the case of the electrophotographic recording medium used in the case of printing a proofing sheet.

That is, in the case of making a planographic printing plate for each color used for the actual printing, any color may be used to form a toner image on the electrophotographic recording medium by using an oil toner in accordance with the electrophotographic process, so that the electrophotographic recording medium used to make a planographic printing plate of each color used in the actual printing may have any color.

On the other hand, the output apparatus 8 is used both in making a proofing sheet and a planographic printing plate so that it is advantageous to use the same kind of the electrophotographic recording media because a sheet feeding mechanism can be made in simple in construction.

The planographic printing plate made by the output apparatus 8 is delivered to a developing processor 9 where the planographic printing plate is made hydrophilic except the oil affinity toner image portions. Thereafter, the printing plate thus processed is delivered to a printing press 10 for making the actual printing.

Figure 6:
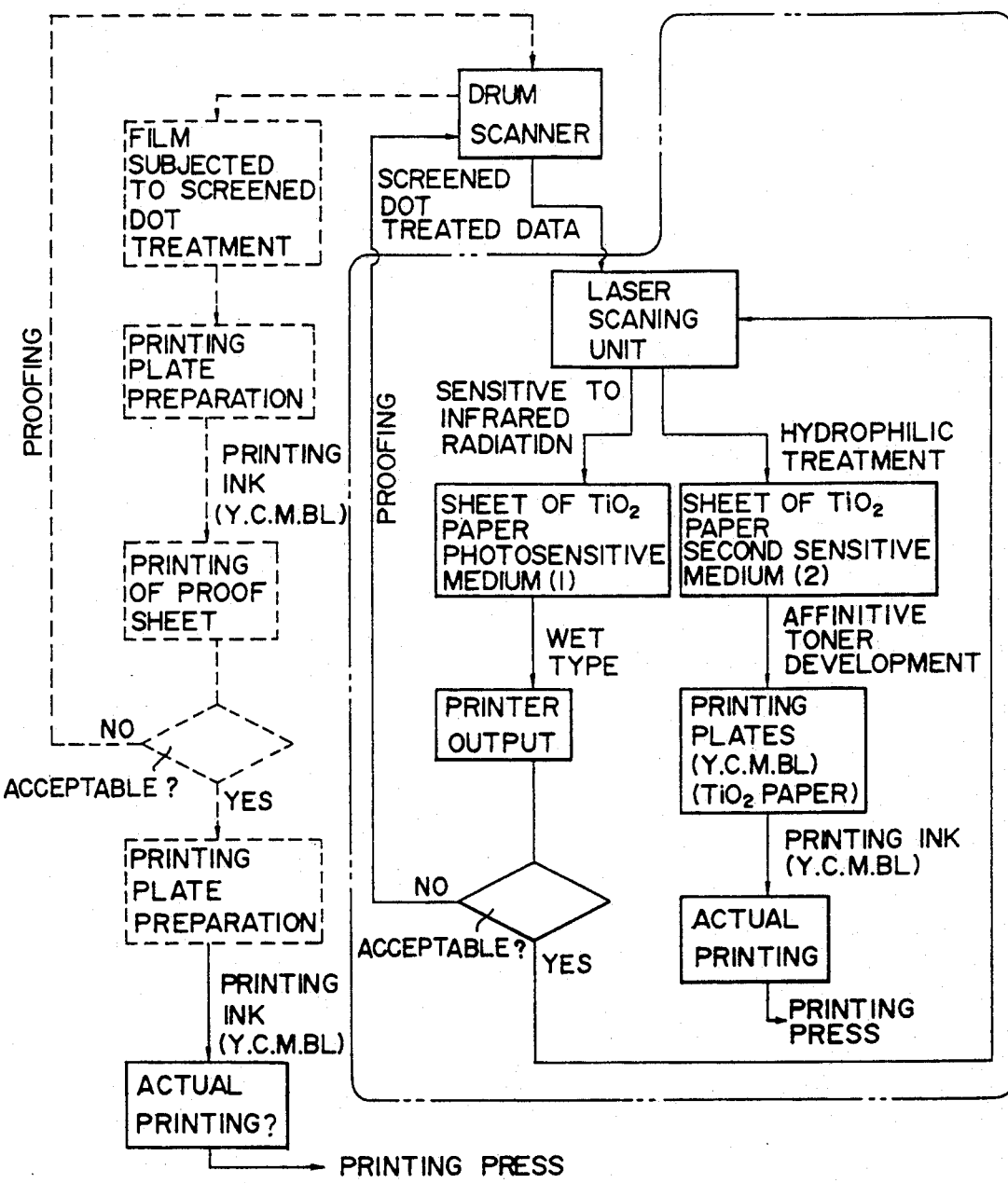
FIG. 6 is a flowchart used to explain the mode of operation of the output apparatus of the first embodiment.

The explanation made above with reference to the schematic view of the printing system including the output apparatus 8 in FIG. 1 is also applied a drum scanner and the various steps enclosed by the two-dot chain line in FIG. 6. In FIG. 6, the electrophotographic recording media used in printing a proofing sheet and making a planographic printing plate are the same (In FIG. 6, they are shown as $TiO_2$ photosensitive media.). Furthermore, the developing step in the electrophotographic process is a wet type and an example for carrying out the operation for making electrophotographic recording medium hydrophilic prior to making a planographic printing plate is shown.

Referring back to FIG. 2, a roll 17 of a thin electrophotographic recording medium P (which is shown as a thin sheet of paper in FIG. 5) consists of a lamination consisting of at least an electrode and an electrophotographic recording medium having a surface in white, for instance a layer of titanium oxide and a bonding agent.

Figure 4:
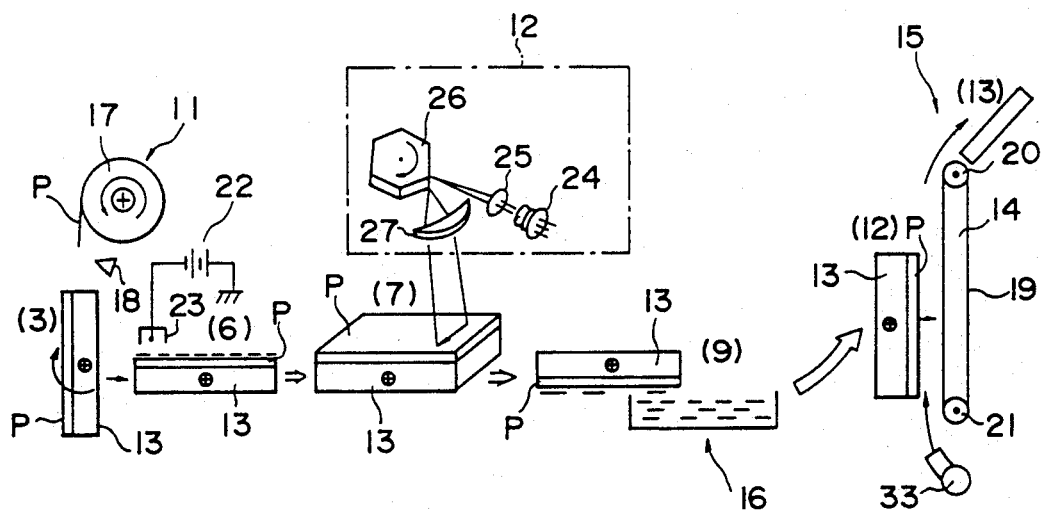
FIGS. 4 and 5 are schematic view used to more specifically explain the mode of operation of the output apparatus of the first embodiment.
Figure 5:
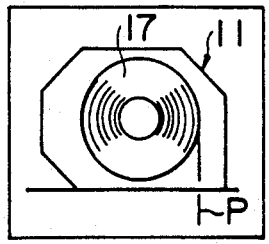
Figure 5:
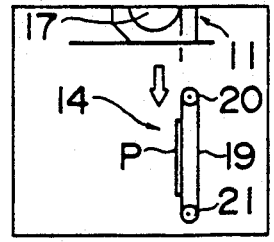
Figure 5:
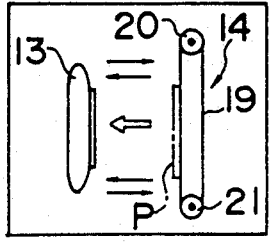
Figure 5:
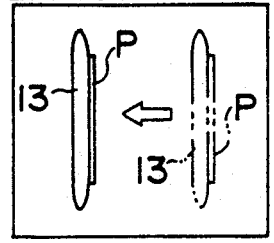
Figure 5:
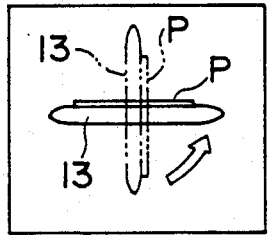
Figure 5:
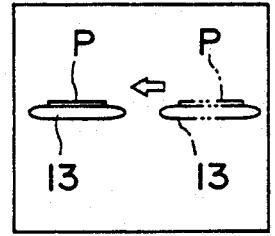
Figure 5:
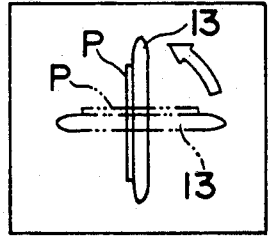
Figure 5:
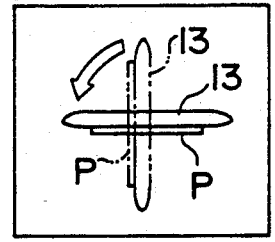
Figure 5:
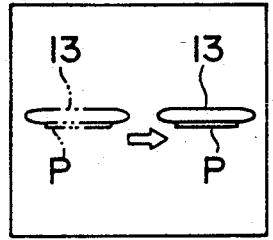

The electrophotographic recording medium P housed within the sheet feeder 11 is unrolled by a predetermined length from the waiting mode as shown in FIG. 5(1) and then cut off by a cutter 18 (See FIG. 4). Thereafter, a sheet thus cut off is sucked by a suction belt 19 in a sheet transportation station 14 so that the paper is in the sheet transportation mode as shown in FIG. 5(2).

The suction belt 9 is extended between a drive roller 20 and a driven roller 21 so that upon rotation of the driving roller 20, the electrophotographic medium P sucked by the suction belt 19 is transported to a predetermined position.

For instance, the suction belt 19 is formed with a large number of small through holes having an extremely fine diameter and the air is sucked through the suction belt 19 by a suitable vacuum pump or the like (not shown) so that the electrophotographic medium P is fixed on the suction belt 19 and transported.

The electrophotographic recording medium P so fixed is transported downwardly to a predetermined position and displaced in the direction indicated by a large arrow in FIG. 5(3), which illustrates the displacement of the paper, and then securely held on an exposure stand 13. The holding operation of the exposure stand is substantially similar to that of the suction belt 19.

Figure 2:
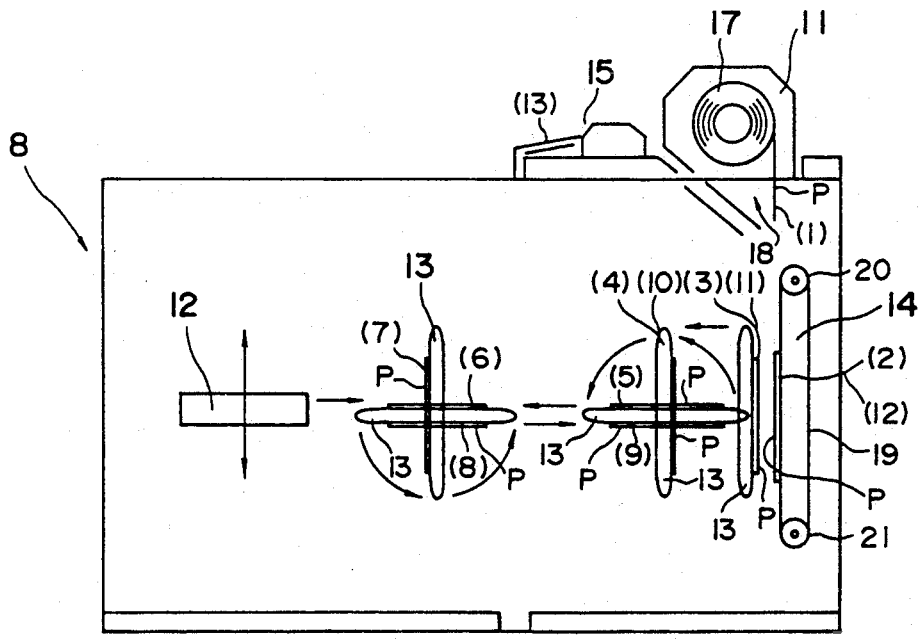
FIGS. 2 and 3 are schematic views used to explain the construction and the mode of operation of the output apparatus of the first embodiment.

When the exposure stand 13 over which is sucked and held the sheet P is moved in the direction indicated by a large arrow in FIG. 5(4), which illustrates the movement of the exposure stand 13, from the position (3) shown in FIG. 2 to the position (4) also shown in FIG. 2, the exposure stand 13 is rotated through 90 degrees in the direction indicated by a large arrow in FIG. 5(5), which illustrates the rotation of the exposure stand 13, so that the exposure stand 13 is maintained horizontally as shown in FIG. 2(5) and then displaced in the direction indicated by a large arrow in FIG. 5(6), which illustrates the displacement (charging).

At the position (6) shown in FIG. 2, the electrophotographic medium P on the exposure stand 13 is subjected to corona charging by a charging means (not shown). In this step, the charger may be disposed within a developing station 16. The mode of subjecting the recording medium P on the exposure stand to the corona charging is accomplished by a power supply 22 and a charging device 23 in FIG. 4.

The electrophotographic recording medium P which is charged by corona charging on the exposure stand 13 is rotated through 90 degrees in the direction indicated by a large arrow in FIG. 5(7) so that the exposure stand 13 is maintained vertically as shown at (7) in FIG. 2. At this position, the electrophotographic recording medium P is exposed by the laser beam emitted from a laser scanning unit 12.

The laser beam which is emitted from the laser scanning unit 12 is modulated by the printing image data, is converted in the coherent beam by a collimator lens 25 and is deflected in the main scanning direction. Next it illuminates through an fθ lens 27 the recording medium P. In addition, the laser scanning unit 12 is displaced in the auxiliary scanning direction so that a charged latent image representative of the information to be recorded is formed over the surface of the electrophotographic recording medium P. The charged image thus formed has a high resolution of, for instance, 1200 dpi. Light used to expose the recording medium P may be the scanning beam from another light source except the laser light source, but in order to form a charged latent image with a high resolution, it is preferable to use the laser scanning process. In addition, it is preferable to use a semiconductor laser emitting the laser beam of a wavelength longer than 500 nm as an exposure light source. Thereafter, the recording medium P exposed on the exposure stand 13 is rotated through 90 degrees in the direction indicated by a large arrow shown in FIG. 5(8) to that the exposure stand 13 is turned upside-down and maintained in the horizontal state.

Figure 3:
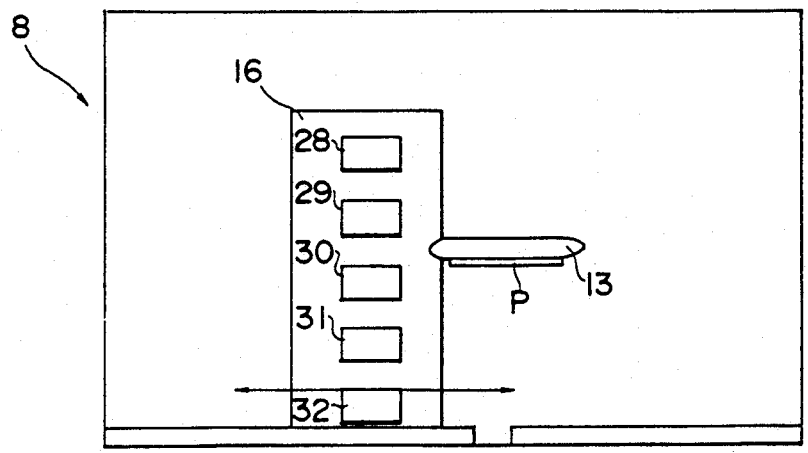

When the exposure stand 13 is displaced in the direction indicated by a large arrow shown in FIG. 5(9) from the position (8) to the position (9) in FIG. 2 and passes over the development station equipped with a plurality of developing means 28–32 (See FIG. 3).

In the development station 16, a plurality of developing 28–32 each containing a liquid toner of different color are supported on, for instance, an endless belt. A predetermined one of the developing tanks 28–32 can be brought to a predetermined position in the vertical direction in FIG. 3 when the endless belt is driven. In addition, the whole developing station 16 moves in the direction indicated by an arrow in FIG. 3, thereby preventing the rotation of the exposure stand. Furthermore, due to the relative movement between the exposure stand 13 and the developing station 16, the charging step, the developing step and so on can be carried out quickly.

In this case, one of the developing tanks 28–32 may be used as a developing processor 9.

By the steps from (1) to (9) shown in FIG. 5, a toner image of a predetermined color is formed over the surface of the recording medium P on the exposure stand 13.

In the case of printing a proofing sheet by the output apparatus 8, based on the printing image data of each color, by successively using toner of different color, the screen dot image of each color must be formed over the white surface of one recording medium P so that through the above described steps, one recording medium P over the surface of which is formed the screened dot image of one predetermined color corresponding to a predetermined one color printing image data must be further formed with a screened dot image of another predetermined color corresponding to another predetermined printing data of another predetermined color.

For instance, it is assumed that a proof sheet is to be printed with yellow (Y), magenta (M), cyan (C) and black toner (BL). In this case, referring to FIG. 5, the steps for forming four screened dot toner images in the above mentioned four colors will become as follows:

(1) the paper waiting mode→(2) paper transportation→(3) placement of a recording medium over the exposure stand→(4) movement of the exposure stand→(5) rotation of the exposure stand→(6) the movement of the exposure stand (exposure)→(7) exposure corresponding to the yellow (Y) printing image data→(8) rotation of the exposure stand→(9) development with yellow (Y) toner→(5) rotation of the exposure stand→(6) movement of the exposure stand (to be charged)→(7) exposure corresponding to the magenta (M) printing image data→(8) rotation of the exposure stand→(9) development with magenta (M) toner→(5) rotation of the exposure stand→(6) movement of the exposure stand (to be charged)→(7) exposure corresponding to the cyan (C) printing image data→(8) rotation of the exposure stand→(9) development with cyan (C) toner→(5) rotation of the exposure stand→(6) movement of the exposure stand (to be charged)→(7) exposure corresponding to the cyan (C) printing image data→(9) development with cyan (C) toner→(5) rotation of the exposure stand→(6) movement of the exposure stand (to be charged)→(7) exposure corresponding to the black (BL) printing image data→(8) rotation of the exposure stand→(9) development with black (BL) toner.

When the screened dot toner images are formed over the white surface of one recording medium P by sequentially using toner of respective colors in accordance with respective color printing image data in the four color—yellow (Y), magenta (M), cyan (C) and black (BL)—printing image data, the exposure stand is rotated through 90 degrees in the direction indicated by a large arrow shown in FIG. 5(10) so that the exposure stand 13 is maintained in the vertical state as shown in FIG. 5 and FIG. 2(10).

Thereafter, the exposure stand 13 is displaced in the direction indicated by a large arrow in FIG. 5(12) (for the sake of drying the back surface) from the position (10) to the position (11) in FIG. 2 so that the surface of the recording medium P is dried.

Next, the recording medium P attracted by the exposure stand 13 is displaced in the direction indicated by a large arrow shown in FIG. 5(12) (drying of the back surface) from the position (11) to the position (12) in FIG. 2 so that the rear surface of the recording medium P is dried.

In order to dry the recording medium P, a blower 33 as shown in FIG. 4 may be used.

Next, the recording medium P attracted by suction over the suction belt 19 is discharged to the discharged recording medium receiving tray or the like 15 as the suction belt 19 is moved in the direction indicated by a large arrow shown in FIG. 5(13).

So far the description of the operation of the output apparatus 8 for printing a proof sheet with reference to FIGS. 2, 3 and 5(1)–(13) has been relatively complicated so that for the sake of easy understanding of the present invention, among FIG. 5(1)–(13), only the recording medium feed (3), charging (6), development (9), drying (12) and discharge (13) are shown in FIG. 4. Referring to FIG. 4, the operation for printing a proof sheet by the output apparatus 8 is accomplished by the following steps of feeding one recording medium P (3)→charging (6)→exposure of a yellow image (7)→development with yellow toner (9)→charging (6)→exposure of a magenta image (7)→development with magenta toner (9)→charging (6)→exposure of a cyan image (9)→charging (6)→development with cyan toner (9)→charging (6)→exposure of a black image (7)→development with black toner (9)→drying (12)→discharge (13).

So far the mode of operation of the output apparatus 8 for printing a proof sheet has been described. Next, the operation of masking a planographic printing plate by the output apparatus 8 will be described. First, an oil affinitive toner image is formed over the surface of one recording medium P in accordance with a printing image data of a predetermined color so that a planographic printing plate of a predetermined color is made.

In the case of making a planographic printing plate (hereinafter referred as "the printing plate"), it is not needed that the surface of the recording medium is white as described above, but in the following description, it is assumed that a recording medium P having a surface in white is used in making the printing plate.

The mode of operation of the output apparatus 8 for making a printing plate will be described with reference to FIGS. 2-5.

For instance, it is assumed that four colors—yellow (Y), magenta (M), cyan (C) and black (BL)—are used in making a printing plate. A screened dot image of a predetermined color is formed over the surface of the recording medium P with oil affinitive toner. This process is repeated four times to prepare four printing plates of respective four colors. Referring to FIGS. 2-5, the yellow printing plate is made by the following steps; (1) recording medium waiting mode→(2) recording medium transportation→(3) placement of the recording medium over the exposure stand→(4) movement of the exposure stand→(5) rotation of the exposure stand→(6) movement of the exposure stand (to be charged)→(7) exposure corresponding to the yellow (Y) printing image data→(8) rotation of the exposure stand→(9) development by oil affinitive toner→(10) the movement of the exposure stand (for drying)→(11) movement of the recording medium P (for drying the rear surface)→(12) recording medium transportation (for drying the rear surface)→(13) recording medium transportation. The printing plates for the rest of colors are prepared in the similar manner.

When the present invention is carried out, in addition to a semiconductor laser emitting the laser beam in the range of light wavelength to which is sensitive a photosensitive medium containing a photoconductive medium, a gas laser source, an LED array, an EL array and the like may be also used as the exposure light source.

In the case of printing a proofing sheet, in addition to wet type toner (liquid toner) 0.1-1 μm in diameter, the dry type toner about 8 μm in diameter may be used. In the case of the wet type toner, toner which is dyed by a pigment of a dye may be used. In the case of making a printing plate, it is preferable that toner has a high degree of oil affinity and durability.

As a photosensitive medium, in addition to titanium oxide which has a high degree of whiteness and the excellent property of exhibiting the continuous tone, zinc oxide, PVK (polyvinyl carbazole) and titanium oxide sensitized to infrared may be used.

When titanium oxide is used as a photosensitive medium, the satisfactory results can be attained in the case of making a printing plate because titanium oxide itself is hydrophilic. Furthermore, when it is hydrophilicized, the satisfactory result free from the ground stains can be obtained. It is apparent that the gum arabic treatment may be applied in the case of making a printing plate.

Second Embodiment, FIGS. 7-13

Figure 7:
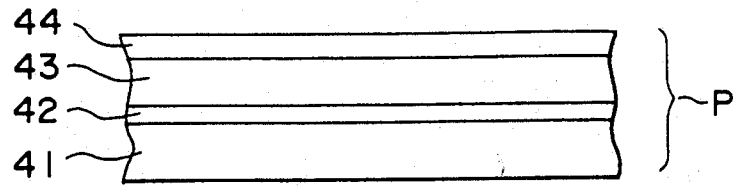
FIG. 7 is a side sectional view of an electrophotographic recording medium used in the proof sheet printing system of a second embodiment in accordance with the present invention.

FIG. 7 is a sectional view of a recording medium P used in printing a proofing sheet. The recording medium P comprises a base 41 made of a suitable material such as a polyester film 100 μm in thickness, an electrode 42 made of a thin electrically conductive material and a photoconductive layer 43 whose major components are titanium oxide and a bonding agent and which is white. Titanium oxide used in the photoconductive layer 43 has a high dielectric constant and a high degree of charge holding capability as compared with other materials. In addition, it is sensitized to the wavelength range of the semiconductor layer by adding a coloring material. Therefore in the case of the recording medium whose photosensitive medium is titanium oxide, a high-quality hard copy can be easily obtained by the CPC process.

In the case of the CPC process, zinc oxide (ZnO) which has been widely used as a photosensitive material may be used, but from the standpoint of whiteness, it is not preferable to use zinc oxide.

An overcoat layer 44 is formed over the upper surface of the photoconductive layer 43. The layer 44 may be made of a thermoplastic or thermoplastic resin (such as polyester, acryl, polystyrene, silicon and the like), but from the standpoint of optical properties and workability, vinyl acetate, styrene plastics and acrylic resins are more preferable.

Furthermore, the overcoat layer 44 must be made of a material whose refractive index is less than 2.0 (more preferably 1.2-1.5) and whose vitrification point is lower than a softening point of toner used for developing the recording medium.

For instance, the overcoat layer 44 is formed by solving an acrylic resin whose softening point is 60°-70° C. into toluene and applying the mixture over the surface of the photoconductive layer 43 by the bar coater to form a film 5-30 $\mu$m in thickness.

The above-described overcoat layer 44 is transparent, but it may formed with the mixture of titanium oxide and a bonding agent which are the components of the photoconductive layer 43. In the latter case, in order to increase its light transmissivity, the ratio of the bonding agent is increased. Furthermore, it is preferable to interpose a thin silicon resin film 0.1-1.0 $\mu$m as a separation layer between the photoconductive layer 42 and the overcoat layer 44.

Next the output of a proofing sheet and a printing plate by the second embodiment will be described.

The output operation of a proofing sheet and a printing plate is substantially similar to that of the first embodiment, no further description shall be made in this specification.

Figure 9:
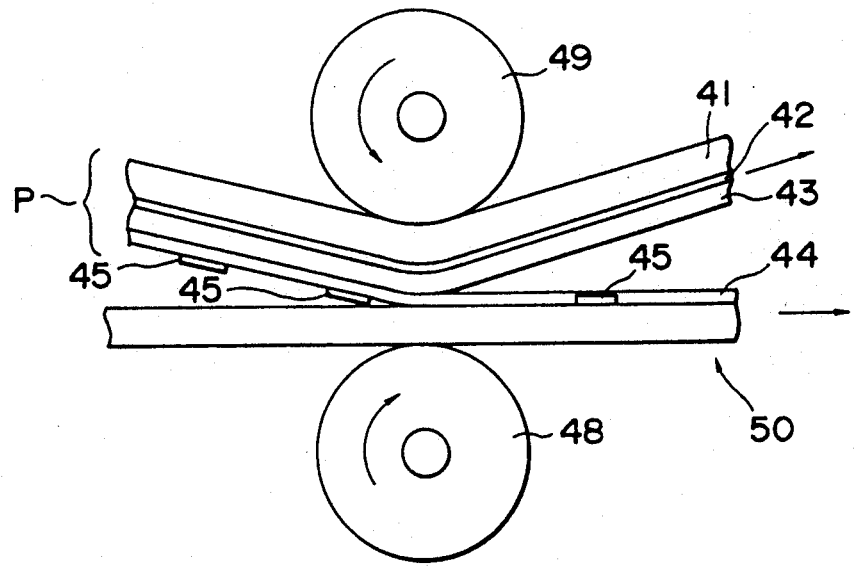
FIG. 9 is a view used to explain how a toner image is transferred together with an overcoat layer to a medium to be transferred in the second embodiment.

Now in the case of printing a proofing sheet by the recording medium and obtaining the output of a proofing sheet by the method described above with reference to FIG. 1, formed over the surface of the overcoat layer 44 of the recording medium of the type described above with reference to FIG. 7 is toner images 45 by the electrophotographic process. Thereafter, heat and pressure are applied to the toner images 45 by rollers 46 and 47 so as to embed them into the overcoat layer 44 so that the recording medium itself may be used as a proofing sheet. Alternatively, the toner images are formed over the surface of the overcoat layer 44 of the recording medium P and then, as shown in FIG. 9, the surface of the overcoat layer 44 over which are formed the toner images 45 and the surface of a transfer sheet 50 to which is transferred the toner images are pressed against each other by, for instance, rollers 48 and 49 and simultaneously heated so that the overcoat layer 44 over which are formed the toner images 45 is transferred to the transfer sheet 50. Next the overcoat layer 44 is separated from the photoconductive layer 43 of the recording medium P. Thus, the transfer sheet 50 integral with the overcoat layer 44 is used as a proofing sheet as will be described in more detail hereinafter.

As described above with reference to FIG. 1, when the proofing sheet printing method in accordance in the present invention by using a recording medium P is carried out in accordance with the electrophotographic process which includes a step of exposing the surface of the overcoat layer 44 of the recording medium P to the light modulated by the printing image data of the digital image data (or the digital image data of the monochrome screened dot image) corresponding to the screened dot images of respective colors, based on the printing image data and by using toner of respective colors, the screened dot images of respective colors are sequentially formed as the toner images 45. Thereafter, as shown in FIG. 8, the toner images 45 are embedded into the overcoat layer 44 of the recording medium P or, as shown in FIG. 9, the toner images 45 together with the overcoat layer 44 are transferred to the transfer sheet 50 are separated from the white photoconductive layer 43 of the recording medium P.

Figure 10:
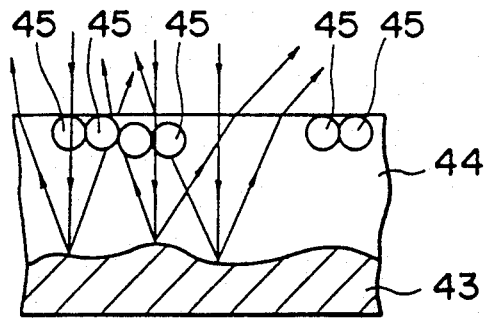
FIGS. 10-13 are views used to explain the difference on the intensity of reflected light.

FIGS. 9 and 10 show the toner images 45 which are formed over the surface of the overcoat layer 44 of the recording medium P by the electrophotographic process. In this case, the recording medium P is of the type described above with reference to FIG. 7.

Figure 8:
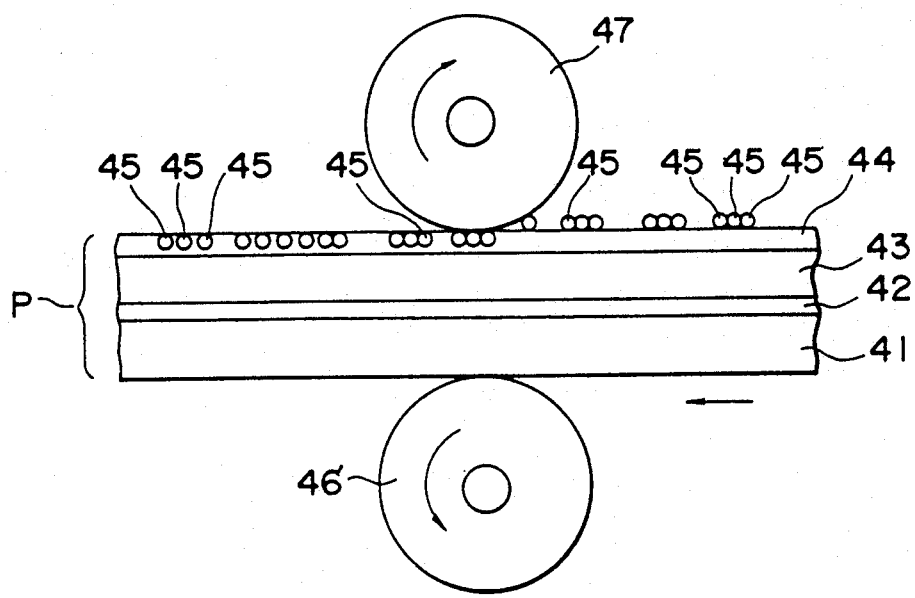
FIG. 8 is a sectional view used to explain how a toner image is embedded in an overcoat layer in the second embodiment of the present invention.

Referring first to FIG. 8, the recording medium P in which the toner images 45 are formed over the surface of the overcoat layer 44 is moved by the heat and pressure application rollers 46 and 47 from the right to the left in FIG. 8.

When the temperature of the overcoat layer 44 becomes higher than a vitrification point of the overcoat layer because of the application of heat and pressure to the toner images 45 formed on the overcoat layer 44 and the overcoat 44 itself by the heat and pressure application rollers 46 and 47, the toner images 45 are embedded into the overcoat layer 44.

Figure 11:
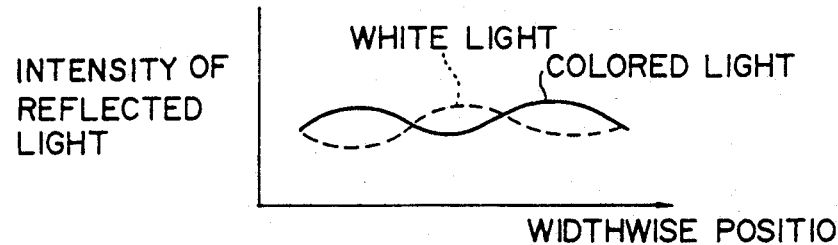
Figure 12:
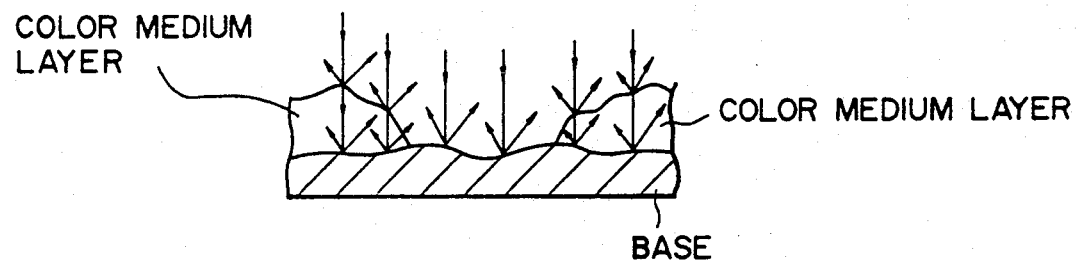
Figure 13:
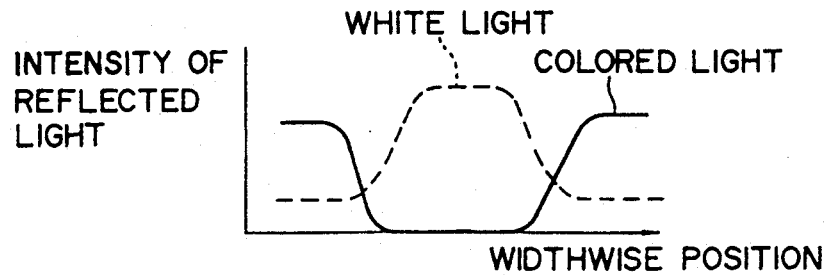

When the toner images 45 are embedded in the overcoat layer as shown in FIG. 10, the problems encountered in the conventional electrophotographic process such as the degradation of the color reproduction and the photosensitivity of photosensitive particles and so on caused by the surface roughness inherent to the electrophotography can be satisfactorily solved. FIG. 11 illustrates the distribution of the intensity of reflected light in the electrographic image embedded into the overcoat layer 44 as shown in FIG. 10. FIG. 13 indicates the distribution of reflected light rays when the toner images 45 are embedded into the overcoat layer 44 as shown in FIG. 10. Unlike the FIG. 13 illustrating the distribution of the reflected light when the toner images 45 are attached over the surface of the base as shown in FIG. 12, when the toner images 45 are embedded into the overcoat layer 44 as shown in FIG. 10, the half tone reproducibility and the graduation of density are remarkably improved so that the color reproducibility equal to that in the case of the color printing can be easily attained.

Thereafter, as shown in FIG. 9, the surface of the overcoat layer 44, upon which are formed the toner images 45, of the recording medium P and the surface of a transfer sheet 50 are made into intimate contact with each other by the rollers 48 and 49 and is displaced from the right to the left in the figure upon rotation of the rollers 48 and 49.

Then, the toner images 45 over the overcoat layer of the recording medium P and the overcoat layer 44 are subjected to heat and pressure by the heat and pressure application rollers 48 and 49 and the surface of the overcoat layer 44 is made into intimate contact with the surface of the transfer sheet 50 so that the whole toner images 45 on the overcoat layer 44 are transferred to the surface of the transfer sheet 50.

Next the overcoat layer 44 of the recording medium P together with the toner images 45 formed thereon is separated from the photoconductive layer 43 of the recording medium P and the overcoat layer 44 with the toner images 45 thereon is integrated with the transfer sheet 50. As a result, the toner images 45 are perfectly transferred to the transfer sheet 50 so that the image quality is improved and the adjustment of the dot gain can be satisfactorily carried out.

A proof sheet can be directly printed on a printing sheet (for instance, card board, a newspaper sheet, a sheet of film and the like), the advantage such as delivering the proof sheet to a customer can be attained.

Figure 14:
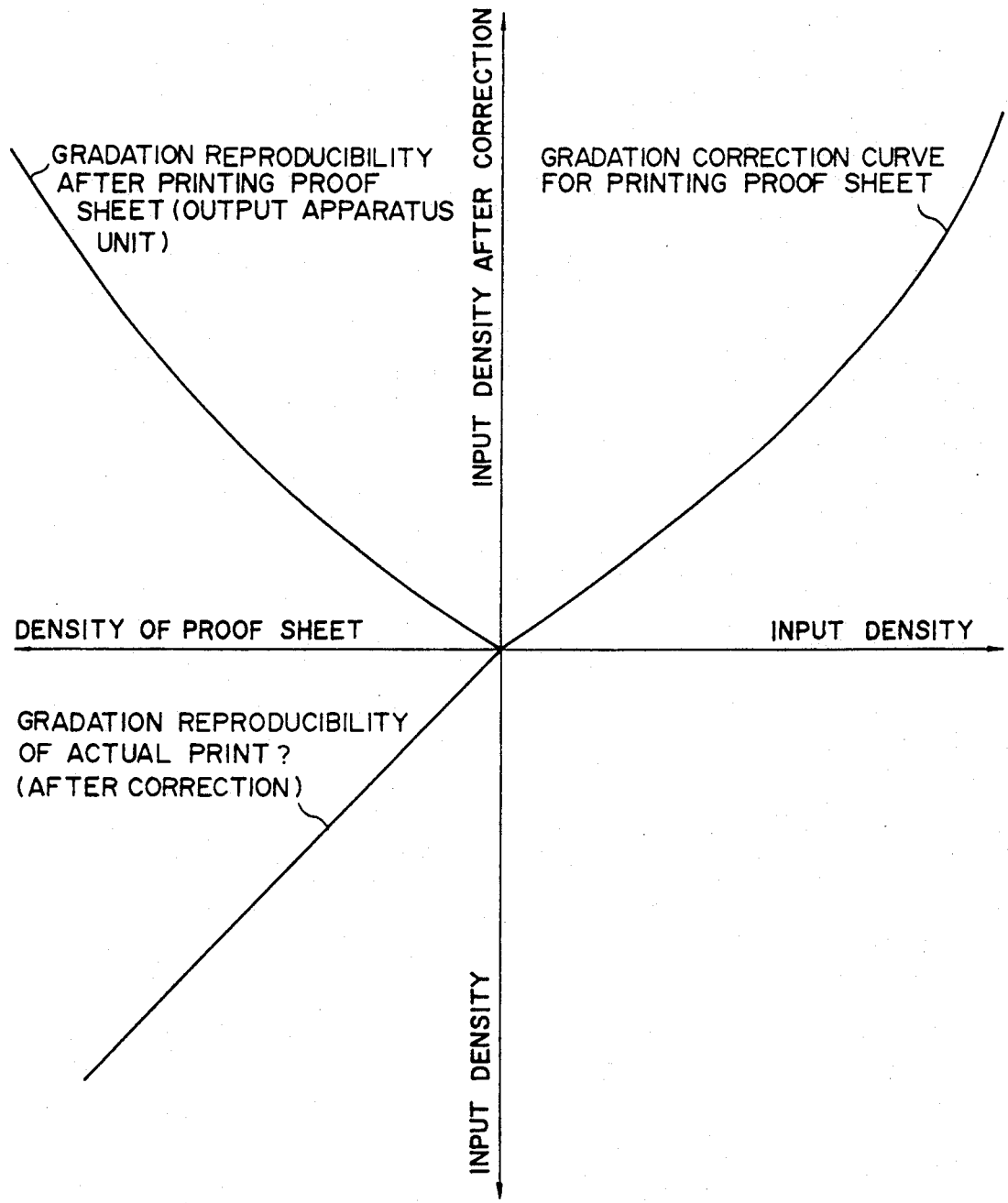
FIG. 14 is a characteristic diagram used to explain the gradation reproducibility, correction curved lines and so on in the case of printing a proof sheet by a print output apparatus of a third embodiment in accordance with the present invention.
Figure 15:
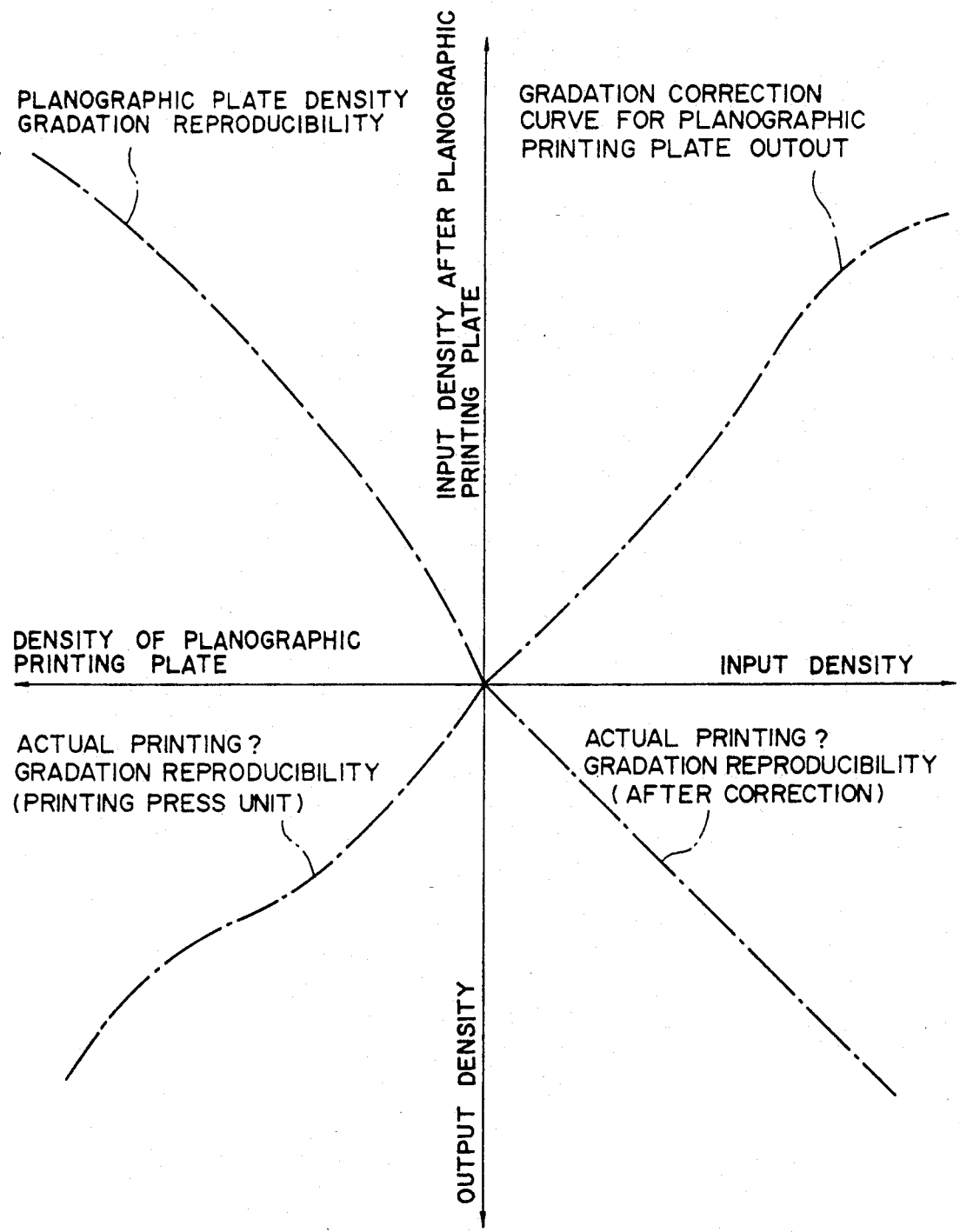
FIG. 15 is a characteristic diagram illustrating the tone reproducibility and corrected curves in the case of the planographic printing in the third embodiment.
Figure 18:
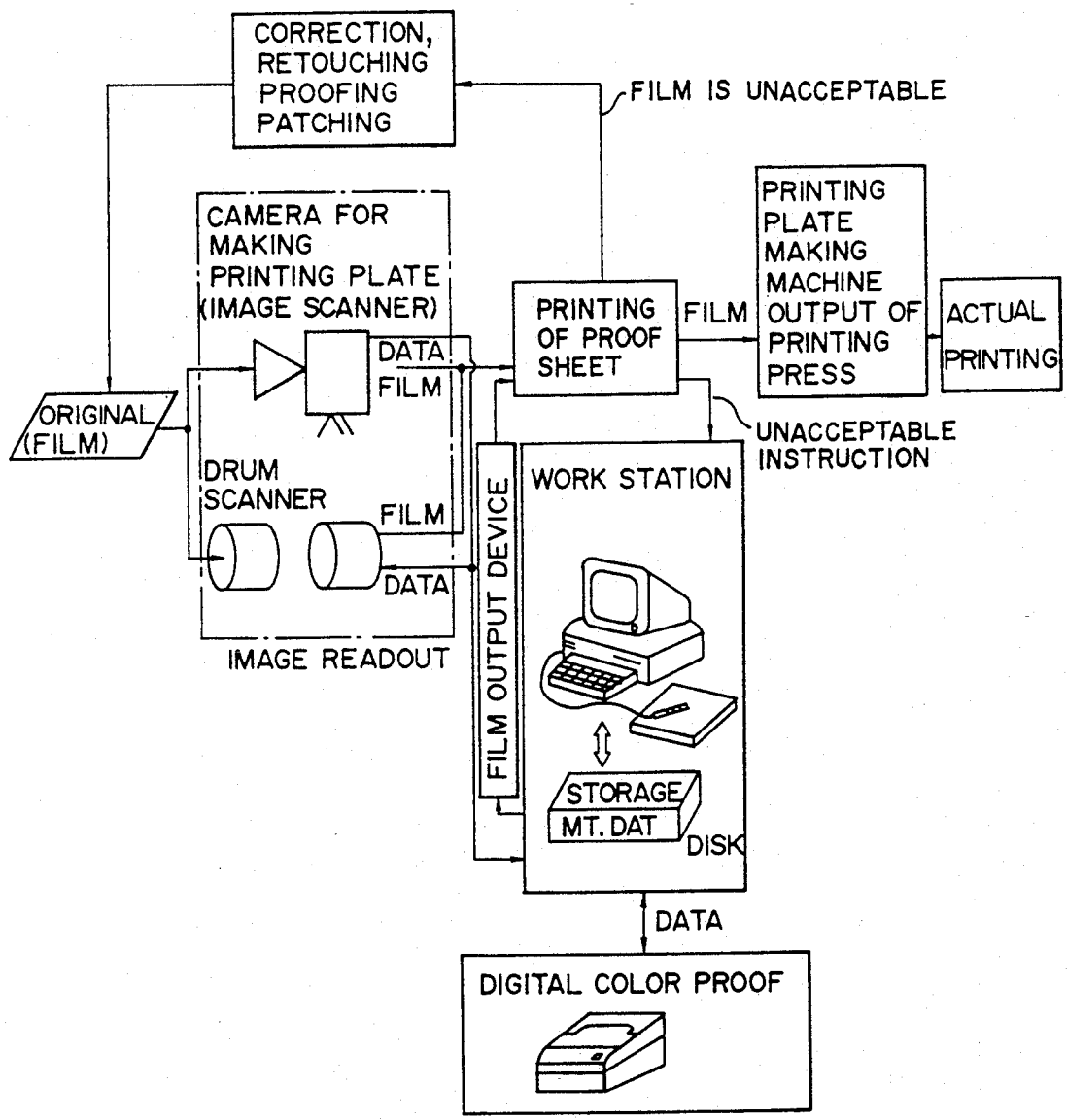
FIG. 18 is a block diagram schematically illustrating a conventional printing system.
Figure 19:
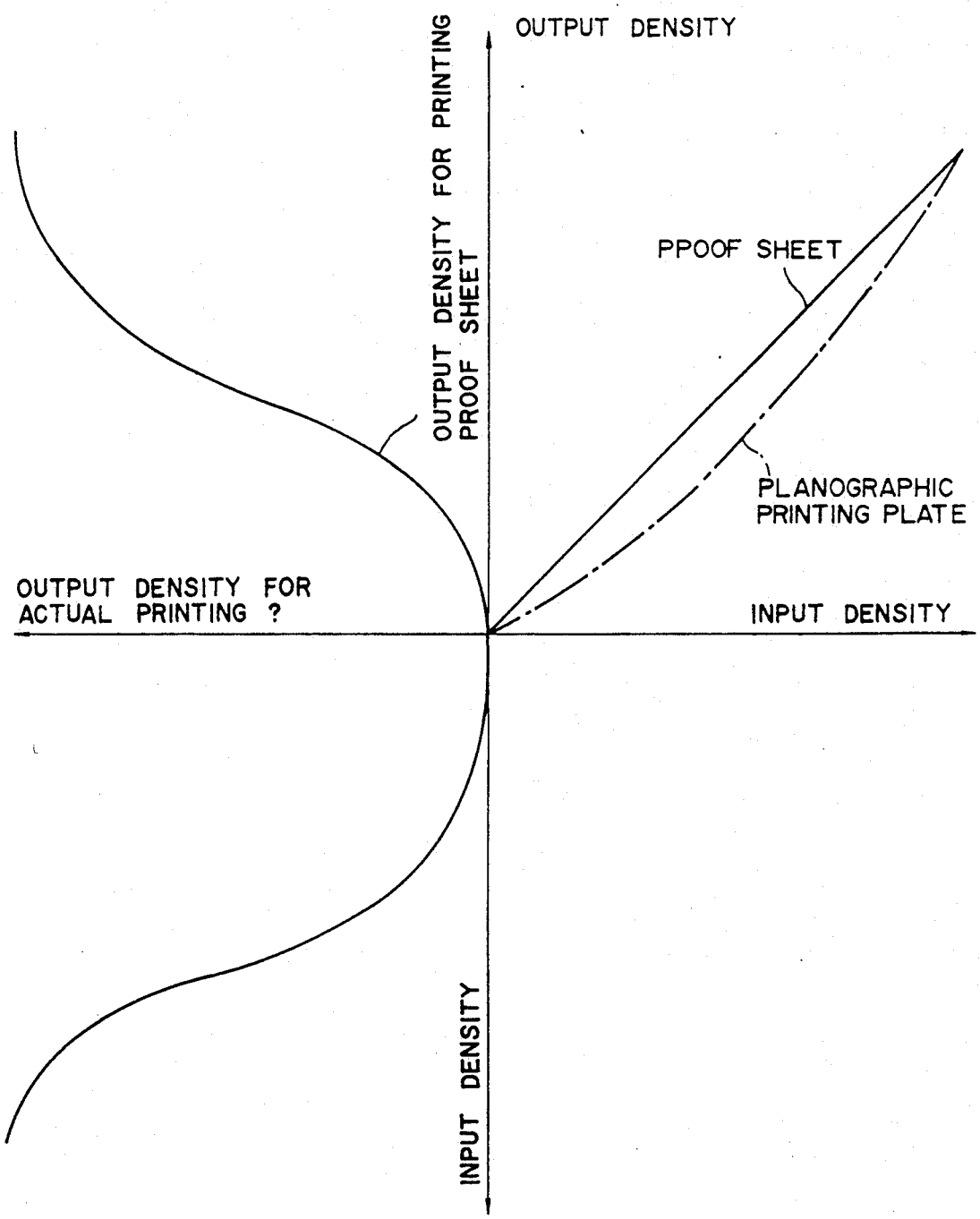
FIG. 19 is a characteristic diagram used to explain the problems encountered by a conventional printing system so that how a fourth embodiment of a printing output apparatus in accordance with the fourth embodiment.

Third Embodiment FIGS. 14–16

Next the underlying principle of the output apparatus of a third embodiment of the present invention will be described. The gradation correction curve of a gradation correction table is shown in the first quadrant of FIG. 14. The input density data corresponding to an image inputted into the output apparatus is corrected based on this gradation correction curve. In the case of the output of a proof sheet from the output apparatus, the gradation reproducibility is represented in the second quadrant. The reproducibility curve in the case of preparing a proof sheet by the output apparatus is the reversed gradation curve in the case of the output apparatus itself so that the total gradation reproducibility of the proof sheet printing becomes a straight line as shown in the third quadrant.

In the case of the actual printing process, as shown in the third quadrant in FIG. 15, the density of the printing plate and the density of an actually printed sheet are represented by the curve so that the gradation curve in the case of the actual printing may be a curve obtained by reversing the curve obtained by combining the curves shown in the second and third quadrants in FIG. 15. Then, the gradation reproducibility having a satisfactory linear relationship between the input and the output can be obtained as shown in the fourth quadrant in FIG. 15 can be obtained.

So far in the case of printing the proof sheet and obtaining the printing plate, it has been described that the gradation tables are switched, but according to the present invention, in the case of printing the proof sheet, one gradation table is used while in the case of making the printing plate, another gradation table superposed on the gradation table for printing a proof sheet can be used. In this case, the method for making the gradation correction tables is more or less changed, but the essential results remain unchanged.

Next the construction of the output apparatus of the third embodiment of the present invention will be described in more detail hereinafter. The whole construction of the third embodiment is substantially similar to the first embodiment shown in FIG. 4. Referring back to FIG. 4, when the magnitude of the driving current applied to the laser diode 24 (LD) is varied, the modulation is carried out in response to the density of the input image signal, whereby the image is outputted.

FIG. 16 is a block diagram of the output apparatus of the third embodiment. The input signal applied to the output apparatus passes a first selection switch SW1 and is subjected to the gradation correction based on the correction table 56 or 57. Thereafter, it passes through a second selection switch (SW2) and driver circuit 59 to the laser diode 60, whereby the magnitude of the output laser beam is increased or decreased. In the case of the output of a printing plate, the movable contact is made into contact with the lower stationary contact in each of the selection switches 55 and 58 while in the case of the output of a proof sheet, the movable contact is made in contact with the upper stationary contact in each of the selection switches 55 and 58. Thus, the correction tables for making a print plate and printing a proof sheet are switched. In this case, the signal path is switched by hardware, but it is apparent to those skilled in the art that the correction table switching can be carried out by software. In the latter case, a plurality of gradation correction tables which are reference for software for effecting the gradation correction and the selection of one of the reference gradation correction table is dependent upon whether the printing table is made or a proof sheet is printed.

Fourth Embodiment, FIG. 17

FIG. 17 illustrates a fourth embodiment of the present invention which is a modification of the third embodiment described above with reference to FIG. 16. In the fourth embodiment, the input applied to the output apparatus passes a first correction table 61 so as to be subjected to the gradation correction and then a first switch 62. The corrected input signal or the corrected input signal which is further subjected to the gradation correction by a correction table 63 passes through a second selection switch 64 and is applied through a driver circuit 65 to a laser diode 66 (24) so that the magnitude of the laser beam emitted therefrom is varied. In the case of printing a proof sheet, the movable contact is made into contact with the upper stationary contact while in the case of making a printing plate, the movable contact is made into contact with the lower stationary contact in each of the first and second selection switches 62 and 64. Thus, according to the fourth embodiment, in the case of printing a proof sheet, the input signal is only subjected to the correction by the correction table 61, but in case of making a printing plate, the input signal is subjected to not only the correction by the correction table 61 but also the correction table 63. It is apparent to those skilled in the art that in the fourth embodiment, the switching operations may be carried out not by hardware but software.

As described above, in the output apparatus according to the third or fourth embodiment, the gradation correction is carried out in the planographic printing press according to the actual printing or the correction table 57 or 63 for the planographic printing. The color reproducibility varies depending upon the printing press used, ink and other printing conditions, but except ink, the printing conditions can be controlled by adjusting the printing steps so that the problem is the difference in gradation reproducibility between the printing presses. In order to obtain a proof sheet by the same output apparatus from any printing press by correcting the difference between the printing press, it suffices to exchange the correction table 57 or 63 for making a printing plate in response to the mode of operation of the printing press used.

More specifically, it suffices to provide a control circuit comprising an adjusting station for exchanging the correction tables 57 and 63, a storage into which is stored the newly selected correction table 57 or 63, an exchanging station for exchanging one or more correction table 57 or 63. For instance, according to one method, the correction table 57 or 63 may be stored in a special semiconductor memory (EEPROM) capable of electrical data erasing and programming and such EEPROMs are exchanged depending upon the type of the printing press. Another method is to write the correction table 57 or 63 on the surface of a magnetic disk incorporated in the output apparatus.

When the above-described control circuit which is one of the fundamental components of the present invention is provided and even when the type of the printing press to be used for an actual printing, the correction table 57 or 63 is adjusted depending upon the type of the printing press, the difference in gradation between a proof sheet and a print obtained by the printing press the corrected new correction table 57 or 63 is stored in a storage. Then, the correction table 57 or 63 may be used in any type of the planographic printing press. In addition, when the control circuit is provided, the optimum planographic printing mode can be set without requiring the manual adjustment of the printing press by an operator.

What is claimed is:

1. An output apparatus for printing a proof sheet and making a planographic printing plate comprising:
    generating means for generating printing image data using digital image data of each color corresponding to separated image data of each of a predetermined number of colors obtained by the color separation of an image data to be printed;
    an electrophotographic recording medium having a white surface, which comprises a lamination of an electrode and a photoconductive layer and over which a toner image can be formed by a light beam modulated depending on the printing image data;
    a proof sheet printing means for forming a screened dot image of each color sequentially by using the toner of each color based on the printing image data over the white surface of said electrophotographic recording medium; and
    a planographic printing plate outputting means for forming a screened dot image of each color of oil affinitive toner over the surface of each said electrophotographic recording medium based on said printing image data of each color selected from said printing image data.

2. An apparatus as defined in claim 1, wherein said electrophotographic recording medium contains titanium oxide.

3. An apparatus as defined in claim 1, wherein said toner is a liquid toner.

4. An apparatus as defined in claim 1, wherein the image output apparatus is capable of outputting an image to be printed in both a proof sheet printing mode and a planographic printing plate making mode, and further comprising, in the case of the image output for a proof sheet printing or a planographic printing plate making, a gradation reproducibility correction table, communicating with the generating means and corresponding with said proof printing mode or said planographic making mode for correcting the printing image date.

5. An output apparatus as defined in claim 1, wherein the image output apparatus is capable of outputting an image to be printed in both a proof sheet printing mode and a planographic printing plate making mode, and further comprising two reproducibility correction tables communicating with the generating means for correcting the printing image data in the case of outputting a proof sheet or a planographic printing plate, when one of a proof sheet and a planographic printing plate is outputted, only one gradation reproducibility correction table is used and when the other is outputted, the other gradation reproducibility correction table is used.

6. A printing method for printing a proof sheet, comprising:
    a step of sequentially forming a toner image of each color by a light beam modulated depending on printing image data of each color based on digital image data of each color corresponding with predetermined separated color data obtained by the color separation of an image data to be printed, over the surface of an electrophotographic recording medium which includes a lamination of a white photoconductive layer on an electrically conductive base and an overcoat layer which is laminated over the surface of said white photoconductive layer in such a way that said overcoat layer can be separated from said white photoconductive layer;
    a first proof sheet printing step of applying heat and pressure over the toner images formed over the overcoat layer of said electrophotographic recording medium, thereby causing said toner images to be embedded into said overcoat layer, whereby said electrophotographic recording medium itself is used as a proof sheet; and
    a second proof sheet printing step of pressing the surface over which are formed said toner images of said overcoat layer of said electrophotographic recording medium and the surface of a transfer sheet into intimate contact with each other and heating thereby transferring the overcoat layer over which are formed said toner images to said transfer sheet, whereby said transfer sheet integral with said overcoat layer over which are formed said toner images is used as a proof sheet.

* * * * *